United States Patent
Kim et al.

(10) Patent No.: US 11,476,523 B2
(45) Date of Patent: Oct. 18, 2022

(54) CYLINDRICAL BATTERY CELL HAVING HEAT-SHRINKABLE TUBE COMPRISING ULTRAVIOLET ABSORBER

(71) Applicant: LG Chem, Ltd., Seoul (KR)

(72) Inventors: Jun-Tak Kim, Daejeon (KR); Je-Jun Lee, Daejeon (KR); Kwang-Su Hwang Bo, Daejeon (KR); Sang-Sok Jung, Daejeon (KR); Gil-Young Lee, Daejeon (KR)

(73) Assignee: LG Energy Solution, Ltd.

( * ) Notice: Subject to any disclaimer, the term of this patent is extended or adjusted under 35 U.S.C. 154(b) by 222 days.

(21) Appl. No.: 16/337,572

(22) PCT Filed: Dec. 26, 2017

(86) PCT No.: PCT/KR2017/015427
§ 371 (c)(1),
(2) Date: Mar. 28, 2019

(87) PCT Pub. No.: WO2018/124673
PCT Pub. Date: Jul. 5, 2018

(65) Prior Publication Data
US 2020/0035962 A1    Jan. 30, 2020

(30) Foreign Application Priority Data

Dec. 26, 2016 (KR) .......... 10-2016-0178728
Dec. 26, 2017 (KR) .......... 10-2017-0179154

(51) Int. Cl.
*H01M 50/116* (2021.01)
*B32B 27/08* (2006.01)
(Continued)

(52) U.S. Cl.
CPC .......... *H01M 50/116* (2021.01); *B32B 27/08* (2013.01); *B32B 27/36* (2013.01); *C08K 5/04* (2013.01);
(Continued)

(58) Field of Classification Search
CPC ... H01M 50/10; H01M 50/116; H01M 50/107
See application file for complete search history.

(56) References Cited

U.S. PATENT DOCUMENTS 6,797,358 B2    9/2004    Murschall et al.
6,863,954 B2    3/2005    Peiffer et al.
(Continued)

FOREIGN PATENT DOCUMENTS

JP    2003528748 A    9/2003
JP    2007323907 A    12/2007
(Continued)

OTHER PUBLICATIONS

JP2009167259A Original and Translation from Espacenet (Year: 2009).*
(Continued)

*Primary Examiner* — Nathanael T Zemui
(74) *Attorney, Agent, or Firm* — Lerner, David, Littenberg, Krumholz & Mentlik, LLP

(57) ABSTRACT

Disclosed is a cylindrical battery cell configured such that the outer surface of a cylindrical case excluding electrode terminals is wrapped by a heat-shrinkable tube, wherein the heat-shrinkable tube includes a tube substrate made of a polyester-based resin, the tube substrate being heat-shrinkable; a reinforcement agent, made of a nylon-based resin, for increasing the tensile stress and operating temperature of the heat-shrinkable tube; and an ultraviolet (UV) absorber for absorbing ultraviolet rays radiated to the heat-shrinkable tube and emitting the absorbed ultraviolet rays as thermal
(Continued)

energy to prevent the scission of polymer chains of the nylon-based resin or the polyester-based resin as the result of reaction with oxygen.

9 Claims, 4 Drawing Sheets

(51) Int. Cl.
*B32B 27/36* (2006.01)
*C08K 5/04* (2006.01)
*C08L 67/03* (2006.01)
*H01M 10/04* (2006.01)
*H01M 10/42* (2006.01)
*H01M 50/107* (2021.01)
*H01M 50/124* (2021.01)

(52) U.S. Cl.
CPC ......... *C08L 67/03* (2013.01); *H01M 10/0422* (2013.01); *H01M 10/4235* (2013.01); *H01M 50/107* (2021.01); *H01M 50/124* (2021.01); *H01M 50/1245* (2021.01); *C08L 2203/20* (2013.01)

(56) References Cited

U.S. PATENT DOCUMENTS

| | | | |
|---|---|---|---|
| 9,209,443 | B2 | 12/2015 | L'Abee et al. |
| 2002/0150751 | A1 | 10/2002 | Murschall et al. |
| 2003/0064195 | A1 | 4/2003 | Murschall et al. |
| 2003/0162868 | A1 | 8/2003 | Stretanski et al. |
| 2004/0067379 | A1 | 4/2004 | Peiffer et al. |
| 2009/0275251 | A1 | 11/2009 | Bonnet et al. |
| 2011/0192564 | A1 | 8/2011 | Mommer et al. |
| 2014/0193716 | A1 | 7/2014 | L'Abee et al. |
| 2015/0030910 | A1* | 1/2015 | Minamibori ............ B32B 33/00 429/163 |
| 2017/0232721 | A1 | 8/2017 | Lim et al. |
| 2018/0069204 | A1* | 3/2018 | Sato ..................... H01M 50/116 |

FOREIGN PATENT DOCUMENTS

| | | | |
|---|---|---|---|
| JP | 2009167259 A | * | 7/2009 |
| JP | 2009167259 A | | 7/2009 |
| JP | 2012209061 A | * | 10/2012 |
| JP | 2012209061 A | | 10/2012 |
| JP | 2013056547 A | | 3/2013 |
| KR | 20010082719 A | | 8/2001 |
| KR | 20120104592 A | | 9/2012 |
| KR | 20140069419 A | | 6/2014 |
| KR | 20160022090 A | | 2/2016 |
| WO | 2014108863 A2 | | 7/2014 |

OTHER PUBLICATIONS

JP2012209061A Original and Translation from Espacenet (Year: 2012).*
International Search Report for PCT/KR2017/015427, dated Aug. 20, 2018.
Extended European Search Report for Application No. 17886393.2 dated Nov. 4, 2019.
Sui Zhaode, Li Jie, Zhang Yujie. Light stabilizer and its application technology[M]. Beijing:China Light Industry Press, 2010; p. 123.
Dagang, Zhou and Gecheng, Xie, "Plastic Aging and Anti-aging Technology," China Light Industry Press, Nov. 1998; pp. 145-147; ISBN 7-5019-2237-3.
Search Report from First Office Action for Chinese Application No. 201780074859.9 dated Jun. 17, 2021; 2 pages.

* cited by examiner

[FIG. 1]
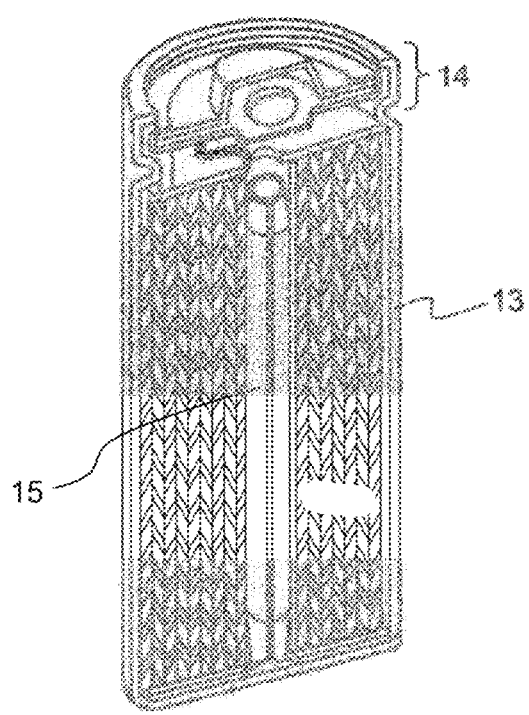

[FIG. 2]
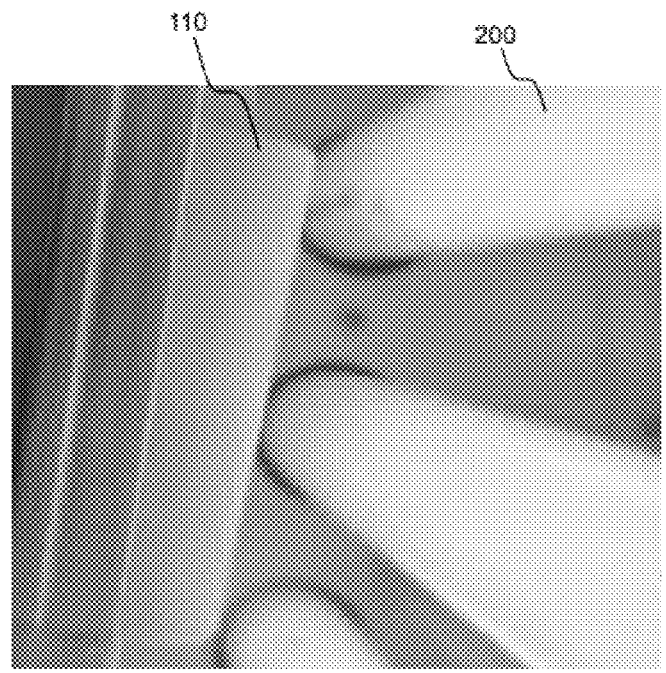
[FIG. 3]
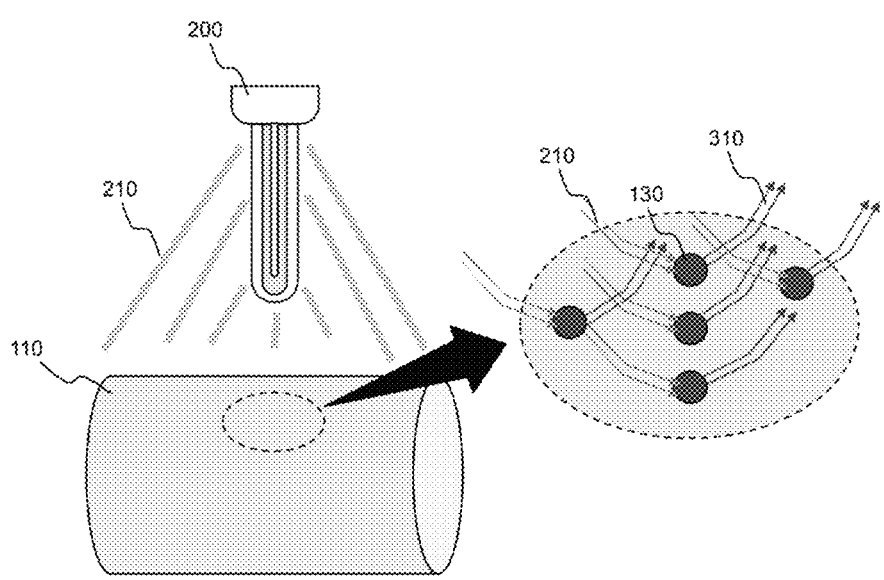

[FIG. 4]

| | BEFORE RADIATION OF ULTRAVIOLET RAYS | AFTER RADIATION OF ULTRAVIOLET RAYS |
|---|---|---|
| GENERAL | SAMPLE1 | SAMPLE1 |
| PARTIAL ENLARGEMENT | LGDBHE41 SAMPLE1 | LGDBHE41 SAMPLE1 |

[FIG. 5]

| | BEFORE RADIATION OF ULTRAVIOLET RAYS | AFTER RADIATION OF ULTRAVIOLET RAYS |
|---|---|---|
| GENERAL | | |
| PARTIAL ENLARGEMENT | LGDBHE2198 P124E032A3 | |

[FIG. 6]
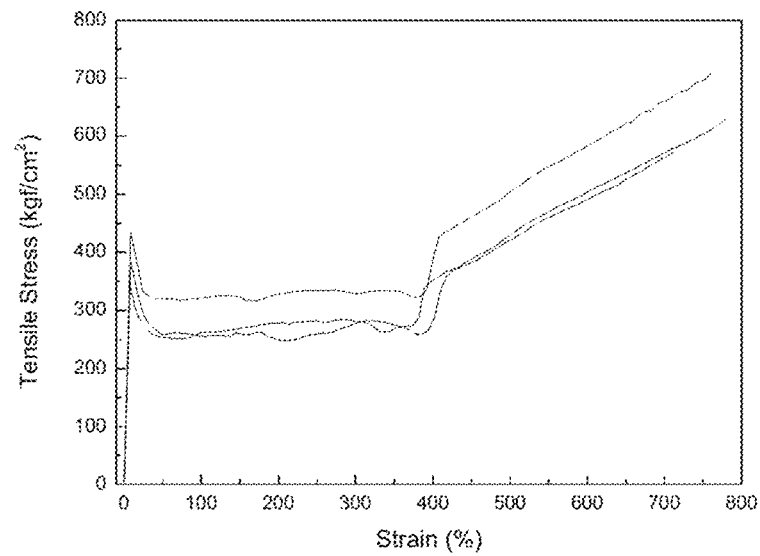
[FIG. 7]
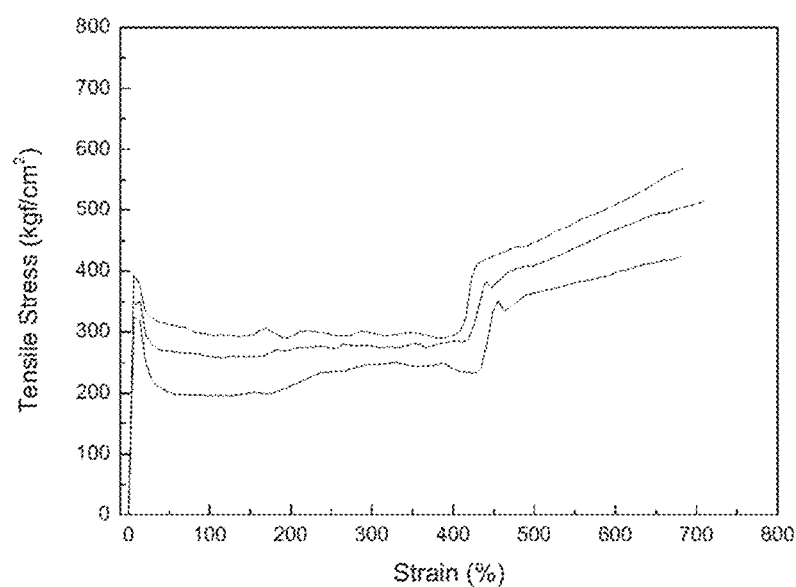

CYLINDRICAL BATTERY CELL HAVING HEAT-SHRINKABLE TUBE COMPRISING ULTRAVIOLET ABSORBER

CROSS-REFERENCE TO RELATED APPLICATION(S)

The present application is a national phase entry under 35 U.S.C. § 371 of International Application No. PCT/KR2017/015427, filed on Dec. 26, 2017, which claims priority to Korean Patent Application No. 10-2017-0179154 filed on Dec. 26, 2017, and Korean Patent Application No. 10-2016-0178728 filed on Dec. 26, 2016, the disclosures of which are incorporated herein by reference.

TECHNICAL FIELD

The present invention relates to a cylindrical battery cell having a heat-shrinkable tube including an ultraviolet absorber.

BACKGROUND ART

As energy prices are increasing due to the depletion of fossil fuels and increasing attention is being paid to environmental pollution, the demand for environmentally friendly alternative energy sources is bound to play an increasing role in the future. Thus, research into techniques for generating various kinds of power, such as nuclear energy, solar energy, wind energy, and tidal power, is underway, and power storage apparatuses for more efficient use of energy generated using such techniques are also drawing a lot of attention.

In particular, as mobile devices have been increasingly developed and the demand for such mobile devices has increased, the demand for batteries as energy sources for such mobile devices has also sharply increased. In recent years, the use of secondary batteries as power sources for electric vehicles (EV) and hybrid electric vehicles (HEV) has been realized, and the fields in which secondary batteries are used have also expanded to applications such as auxiliary power supplies through grid technology. Accordingly, a lot of research on batteries that are capable of satisfying various needs has been carried out.

In general, secondary batteries may be classified based on the shape of a battery case of each of the secondary batteries into a cylindrical battery, configured to have a structure in which an electrode assembly is mounted in a cylindrical metal can, a prismatic battery, configured to have a structure in which an electrode assembly is mounted in a prismatic metal can, and a pouch-shaped battery, configured to have a structure in which an electrode assembly is mounted in a pouch-shaped case made of a laminated aluminum sheet. Here, an electrode assembly, which is mounted in a battery case, is a power-generating element that has a structure including a positive electrode, a negative electrode, and a separator interposed between the positive electrode and the negative electrode and that can be charged and discharged. The electrode assembly is mainly classified as a jelly-roll type electrode assembly, which is configured to have a structure in which a long sheet type positive electrode and a long sheet type negative electrode, to which active materials are applied, are wound in the state in which a separator is interposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are interposed respectively between the positive electrodes and the negative electrodes.

FIG. 1 is a vertical sectional perspective view schematically showing a conventional cylindrical battery.

Referring to FIG. 1, a cylindrical secondary battery 10 is manufactured by placing a jelly-roll type (a wound type) electrode assembly 12 into a cylindrical case 13, injecting an electrolytic solution into the cylindrical case 13, and coupling a cap assembly 14, having an electrode terminal (e.g. a positive electrode terminal) formed thereat, to the open upper end of the cylindrical case 13.

In such a cylindrical secondary battery, the outer surface of the battery case is covered with a tube made of an electrically insulative plastic film such that the cylindrical secondary battery can be insulated from external conductive material and the external appearance of the cylindrical secondary battery can be protected.

However, conventional tubes for cylindrical secondary batteries have problems that when exposed to ultraviolet rays (UV) for a long time, the films are damaged or discolored, which means that the inherent insulating function is lost and it is impossible to protect exteriors of batteries.

Furthermore, in the case in which the tube, attached to the outer surface of the battery case of the cylindrical secondary battery, is exposed to high temperatures or in the case in which external impacts are applied to the tube, the tube may be easily deformed, whereby the tube may become defective.

Therefore, there is an urgent necessity for technology that is capable of effectively solving the above problems.

DISCLOSURE

Technical Problem

The present invention has been made to solve the above problems and other technical problems that have yet to be resolved.

As a result of a variety of extensive and intensive studies and experiments to solve the problems described above, the inventors of the present application have found that, in the case in which a cylindrical battery cell includes an ultraviolet (UV) absorber that absorbs ultraviolet rays radiated to a heat-shrinkable tube and emits the absorbed ultraviolet rays as thermal energy to prevent the scission of polymer chains of a nylon-based resin or a polyester-based resin as the result of reaction with oxygen, as will be described below, it is possible for the cylindrical battery cell to have desired effects. The present invention has been completed based on these findings.

Technical Solution

In accordance with the present invention, the above and other objects can be accomplished by the provision of a cylindrical battery cell configured such that the outer surface of a cylindrical case excluding electrode terminals is wrapped by a heat-shrinkable tube, wherein the heat-shrinkable tube includes a tube substrate made of a polyester-based resin, the tube substrate being heat-shrinkable; a pigment for realizing a color to the heat-shrinkable tube; a reinforcement agent, made of a nylon-based resin, for increasing the tensile stress and operating temperature of the heat-shrinkable tube; and an ultraviolet (UV) absorber for absorbing ultraviolet rays radiated to the heat-shrinkable tube and emitting the absorbed ultraviolet rays as thermal energy to prevent the scission of polymer chains of the nylon-based resin or the polyester-based resin as the result of reaction with oxygen.

As described above, the cylindrical battery cell according to the present invention includes an ultraviolet absorber that absorbs ultraviolet rays radiated to a heat-shrinkable tube and emits the absorbed ultraviolet rays as thermal energy to prevent the scission of polymer chains of a nylon-based resin or a polyester-based resin as the result of reaction with oxygen. Consequently, the heat-shrinkable tube is not damaged or discolored even when the tube is exposed to ultraviolet rays for a long time, whereby the cylindrical battery cell may remain insulated, and the external appearance of the cylindrical battery cell may be effectively protected.

In addition, in the cylindrical battery cell according to the present invention, a reinforcement agent, made of a nylon-based resin, for increasing the tensile stress and operating temperature of the heat-shrinkable tube is added to the heat-shrinkable tube, whereby it is possible to prevent the tube from being easily deformed due to exposure to high temperatures or external impacts.

The heat-shrinkable tube may further include a pigment for realizing a color. Battery cells having different capacities may be distinguished from each other using colors, whereby it is possible to easily sort the battery cells and to easily distinguish between the battery cells.

In a concrete example, the polyester-based resin may be, for example, polyethylene terephthalate.

Preferably, the polyester-based resin may account for 70 weight % to 90 weight % of the total weight of the heat-shrinkable tube. More specifically, in the case in which the polyester-based resin is included in an amount of less than 70 weight % thereof, it is difficult to obtain appropriate heat shrinkage required by the present invention, whereby it is difficult to properly exhibit the function of the heat-shrinkable tube. In the case in which the polyester-based resin is included in an amount of greater than 90 weight % thereof, on the other hand, the heat-shrinkable tube may be easily and excessively deformed or deteriorated when the heat-shrinkable tube is exposed to high temperatures.

In a concrete example, the heat-shrinkable tube of the cylindrical battery cell may have a thickness ranging from 1 μm to 100 μm.

In a concrete example, the ultraviolet absorber may be a benzophenone-based compound. Preferably, the benzophenone-based compound may be hydroxy benzophenone.

In addition, the ultraviolet absorber may account for 0.1 weight % to 5 weight %, preferably 0.5 weight % to 5 weight %, of the total weight of the heat-shrinkable tube. More specifically, in the case in which the ultraviolet absorber is included in an amount of less than 0.1 weight % thereof, it is difficult to prevent the scission of polymer chains of a nylon-based resin or a polyester-based resin of the ultraviolet absorber as the result of reaction with oxygen, whereby it is difficult to prevent the formation of cracks in the heat-shrinkable tube due to the radiation of ultraviolet rays to the heat-shrinkable tube. In the case in which the ultraviolet absorber is included in an amount of greater than 5 weight % thereof, on the other hand, the ultraviolet absorber, which is expensive, is added in excess, whereby the ratio of manufacturing costs to UV stabilization is excessively increased.

In a concrete example, the nylon-based resin may be nylon 66. Nylon 66 has a heat deflection temperature of 70° C., which is relatively high, a heat resistance temperature of 105° C., a tensile modulus of $2.9 \times 10^4$ kg/cm$^2$, and a flexural modulus of $3.0 \times 10^4$ kg/cm$^2$. Nylon 66 exhibits higher heat resistance and mechanical strength than nylon 6, nylon 6-10, and nylon 6-12.

In addition, the nylon-based resin may account for 3 weight % to 10 weight % of the total weight of the heat-shrinkable tube.

In addition, the nylon-based resin may be contained in the polyester-based resin in a blended state.

In a concrete example, the pigment may account for 10 weight % to 20 weight % of the total weight of the heat-shrinkable tube.

In a concrete example, no cracks may be formed in the heat-shrinkable tube even when the heat-shrinkable tube is exposed to ultraviolet rays having a light intensity of 61.5 W/m$^2$ and a light wavelength of 300 nm to 400 nm for 1,000 hours in an atmospheric condition of 50° C.

In a concrete example, the heat-shrinkable tube may further include an ultraviolet (UV) stabilizer for restraining the chain reaction of free radicals generated as the result of the polymer chains of the nylon-based resin or the polyester-based resin being cut by radiated ultraviolet rays. Preferably, the ultraviolet stabilizer may be a benzoate-based compound, and the benzoate-based compound may be, for example, butyl-4-hydroxybenzoate.

Consequently, it is possible to prevent the formation of cracks in the heat-shrinkable tube according to the present invention by the addition of the ultraviolet absorber and to restrain the chain reaction of free radicals generated as the result of the polymer chains of the nylon-based resin or the polyester-based resin being cut by radiated ultraviolet rays by the addition of the ultraviolet stabilizer, whereby it is possible to prevent deterioration of the heat-shrinkable tube due to exposure to ultraviolet rays for a longer time.

In a concrete example, the cylindrical battery cell may be a secondary battery. The kind of the secondary battery is not particularly restricted. In a concrete example, the battery cell may be a lithium secondary battery, such as a lithium ion battery or a lithium ion polymer battery, which exhibits high energy density, discharge voltage, and output stability.

In general, a lithium secondary battery includes a positive electrode, a negative electrode, a separator, and a non-aqueous electrolytic solution containing lithium salt.

Hereinafter, the components of the lithium secondary battery will be described.

Specifically, the positive electrode may be manufactured, for example, by applying a positive electrode mixture comprising a positive electrode active material composed of positive electrode active material particles, a conductive agent, and a binder to a positive electrode current collector. A filler may be further added to the positive electrode mixture as needed.

The positive electrode current collector is manufactured so as to have a thickness of 3 to 201 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Preferably, the positive electrode current collector may be made of aluminum. The positive electrode current collector may have a micro-scale uneven pattern formed on the surface thereof so as to increase the force of adhesion of the positive electrode active material. The positive electrode current collector may be configured in various forms, such as a film, a sheet, a foil, a net, a porous body, a foam body, and a non-woven fabric body.

In addition to the positive electrode active material particles, the positive electrode active material may be, but is not limited to, a layered compound such as a lithium nickel oxide ($LiNiO_2$) or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 0.1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder, which is included in the positive electrode, is a component assisting in binding between the active material and the conductive agent and in binding with the current collector. The binder is generally added in an amount of 0.1 to 30 weight % based on the total weight of the compound including the positive electrode active material. The examples of the binder may be polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The negative electrode may be manufactured by applying a negative electrode active material to a negative electrode current collector and drying the same. The above-described components included in the positive electrode may be selectively further included in the negative electrode as needed.

In general, the negative electrode current collector is manufactured so as to have a thickness of 3 to 500 μm. The negative electrode current collector is not particularly restricted, so long as the negative electrode current collector exhibits high conductivity and the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \le x \le 1$; $1 \le y \le 3$; $1 \le z \le 8$); a lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The non-aqueous electrolytic solution containing lithium salt comprises a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

BRIEF DESCRIPTION OF DRAWINGS

FIG. 1 is a vertical sectional perspective view showing a conventional cylindrical battery;

FIG. 2 is a photograph showing an experimentation process according to Experimental Example 1 of the present invention;

FIG. 3 is a schematic view illustrating the mechanism of an ultraviolet absorber included in a heat-shrinkable tube according to the present invention;

FIG. 4 is a photograph showing the results of Example 1 according to Experimental Example 2;

FIG. 5 is a photograph showing the results of Comparative Example 2 according to Experimental Example 2;

FIG. 6 is a graph showing stress-strain curves (S-S Curve) of Example 1 according to Experimental Example 3; and FIG. 7 is a graph showing stress-strain curves (S-S Curve) of Comparative Example 3 according to Experimental Example 3.

Best Mode

Hereinafter, the present invention will be described with reference to the following example. This example is provided only for illustration of the present invention and should not be construed as limiting the scope of the present invention.

<Example 1>

Based on the total weight of a composition, 80 g of polyethylene terephthalate, 2 g of hydroxy benzophenone as an ultraviolet absorber, 8 g of pigment, and 10 g of nylon 66 were mixed, melted, and blended to manufacture a resin composition. The manufactured resin composition was hardened through rapid cooling performed by a cooling device to manufacture a heat-shrinkable cylindrical tube open at the upper and the lower parts thereof.

<Comparative Example 1>

A heat-shrinkable tube was manufactured in the same manner as in Example 1 except that a resin composition was manufactured without using hydroxy benzophenone as an ultraviolet absorber and without using nylon 66.

<Comparative Example 2>

A heat-shrinkable tube was manufactured in the same manner as in Example 1 except that a resin composition was manufactured without using hydroxy benzophenone as an ultraviolet absorber.

<Comparative Example 3>

A heat-shrinkable tube was manufactured in the same manner as in Example 1 except that a resin composition was manufactured without using nylon 66.

<Experimental Example 1>

FIG. 2 is a photograph showing an experimentation process according to Experimental Example 1 of the present invention. As shown in FIG. 2, each of the heat-shrinkable tubes 110 manufactured according to Example 1 and Comparative Examples 1 to 3 was disposed so as to be spaced 3 cm apart from a lamp of an ultraviolet radiator 200, and was exposed to ultraviolet rays having a light intensity of 61.5 W/m$^2$ and a light wavelength of 300 nm to 400 nm for 1,000 hours in an atmospheric condition of 50° C. to check whether cracks were formed in the surface of each tube.

TABLE 1

|  | Formation of cracks (Yes or No) |
| --- | --- |
| Example 1 | No |
| Comparative Example 1 | Yes |
| Comparative Example 2 | No |
| Comparative Example 3 | No |

Referring to Table 1 above, cracks were formed in Comparative Example 1, in which neither nylon nor an ultraviolet absorber were used; however, no cracks were formed in Example 1 and Comparative Examples 2 and 3 even after ultraviolet radiation for 1,000 hours. That is, in the case in which a nylon-based resin is added to a tube substrate material made of a polyester-based resin, as in Comparative Example 2, it is possible to prevent the formation of cracks in the heat-shrinkable tube due to the elasticity of nylon, which is an inherent physical property of nylon. In addition, in the case in which an ultraviolet absorber is included in a tube substrate material made of a polyester-based resin, as in Comparative Example 3, it is possible to prevent the formation of cracks in the heat-shrinkable tube, since the ultraviolet absorber prevents the scission of polymer chains of the nylon-based resin and the polyester-based resin.

In addition, in the case in which a nylon-based resin and an ultraviolet absorber are included in a tube substrate material made of a polyester-based resin, as in Example 1, it is possible to further prevent the formation of cracks in the heat-shrinkable tube due to the synergistic effect thereof.

Meanwhile, FIG. 3 is a schematic view illustrating the mechanism of the ultraviolet stabilizer included in the heat-shrinkable tube according to the present invention. Referring to FIG. 3, free radicals 120, generated as the result of the polymer chains of the nylon-based resin or the polyester-based resin being cut by ultraviolet rays radiated to the heat-shrinkable tube 110 from the ultraviolet radiator 200, react with an ultraviolet stabilizer 130, whereby it is possible to restrain the chain reaction of the free radicals 120.

<Experimental Example 2>

The heat-shrinkable tube manufactured according to Example 1 and the heat-shrinkable tube manufactured according to Comparative Example 2 were prepared, and black letters were printed on the surface of each tube. The heat-shrinkable tubes were exposed to light radiated by the ultraviolet radiator, having a light intensity of 61.5 W/m$^2$ and a light wavelength of 300 nm to 400 nm, for 500 hours to check the discoloration of the black letters. The results are shown in FIGS. 4 and 5.

FIG. 4 shows the discoloration of the heat-shrinkable tube manufactured according to Example 1, and FIG. 5 shows the discoloration of the heat-shrinkable tube manufactured according to Comparative Example 2.

Referring to FIGS. 4 and 5, in the case of Example 1, it can be seen that the letters was hardly discolored after the radiation of ultraviolet rays; however, in the case of Comparative Example 2, it can be seen that the color of the letters was changed from black to gray. That is, it can be seen that the letters became very dim. In the case in which the ultraviolet absorber is included, therefore, it can be seen that the discoloration of the tube is not affected. In the case in which the ultraviolet absorber is not included, however, it can be seen that the discoloration of the tube is remarkable.

<Experimental Example 3>

The tensile stress and strain of three heat-shrinkable tubes manufactured according to Example 1 and three heat-shrinkable tubes manufactured according to Comparative Example 3 were measured using a universal test machine.

In the state in which each of the insulative sheathing test samples was placed on the test machine, a stress-strain curve (S-S curve) of each sample was measured while each sample was stretched at a predetermined speed. The results of Example 1 are shown in FIG. 6, and the results of Comparative Example 3 are shown in FIG. 7. Concrete values of the results are shown in Table 2.

TABLE 2

|  | Example 1 | Comparative Example 3 |
| --- | --- | --- |
| Tensile stress (Kgf/cm$^2$) | 636 (Average) | 569 (Average) |
| Strain (%) | 750 (Average) | 683 (Average) |

Referring to Table 2 above and FIGS. 6 and 7, the tensile stress and strain of the heat-shrinkable tubes manufactured according to Example 1 are higher than the tensile stress and strain of the heat-shrinkable tubes manufactured according to Comparative Example 3. Consequently, it can be seen that a heat-shrinkable tube including an ultraviolet absorber and nylon exhibits higher mechanical strength than a heat-shrinkable tube including no ultraviolet absorber and no nylon. The reason for this is that nylon exhibits high tensile stress and elasticity.

As can be seen from the above, the heat-shrinkable tube according to the present invention includes a nylon-based resin and an ultraviolet absorber in a tube substrate material, and the formation of cracks in the heat-shrinkable tube is restrained as long as the heat-shrinkable tube includes any one of the nylon-based resin and the ultraviolet absorber. In addition, in the case in which the nylon-based resin is included but the ultraviolet absorber is not included, it can be seen that the tensile stress and strain of the heat-shrinkable tube are increased, but the heat-shrinkable tube is remarkably discolored as the result of the radiation of ultraviolet rays.

That is, the present invention has the synergistic effect that can be obtained by including both the nylon-based resin and the ultraviolet absorber. Consequently, it is possible to prevent the formation of cracks in the tube and to prevent the discoloration of the tube due to the radiation of ultraviolet rays.

Although the example of the present invention has been disclosed for illustrative purposes, those skilled in the art will appreciate that various modifications, additions, and substitutions are possible, without departing from the scope and spirit of the invention as disclosed in the accompanying claims.

INDUSTRIAL APPLICABILITY

As is apparent from the above description, in the case in which the cylindrical battery cell according to the present invention includes an ultraviolet absorber that absorbs ultraviolet rays radiated to a heat-shrinkable tube and emits the absorbed ultraviolet rays as thermal energy to prevent the scission of polymer chains of a nylon-based resin or a polyester-based resin as the result of reaction with oxygen, the heat-shrinkable tube is not damaged or discolored even when the tube is exposed to ultraviolet rays for a long time, whereby the cylindrical battery cell may remain insulated, and the external appearance of the cylindrical battery cell may be effectively protected.

In addition, in the cylindrical battery cell according to the present invention, a reinforcement agent, made of a nylon-based resin, for increasing the tensile stress and operating temperature of the heat-shrinkable tube is added to the heat-shrinkable tube, whereby it is possible to prevent the tube from being easily deformed due to exposure to high temperatures or external impacts.

The invention claimed is:

1. A cylindrical battery cell configured such that an outer surface of a cylindrical case excluding electrode terminals is wrapped by a heat-shrinkable tube, wherein the heat-shrinkable tube comprises:

a tube substrate made of a polyester-based resin, the tube substrate being heat-shrinkable;

a reinforcement agent, made of a single nylon-based resin consisting of nylon 66, for increasing tensile stress and operating temperature of the heat-shrinkable tube, the nylon-based resin being included in an amount of 3 weight % to 10 weight % of a total weight of the heat-shrinkable tube; and an ultraviolet (UV) absorber for absorbing ultraviolet rays radiated to the heat-shrinkable tube and emitting absorbed ultraviolet rays as thermal energy to prevent scission of polymer chains of the nylon-based resin or the polyester-based resin as a result of reaction with oxygen wherein the ultraviolet absorber is a benzophenone-based compound, and wherein no cracks are formed in the heat-shrinkable tube even when the heat-shrinkable tube is exposed to ultraviolet rays having a light intensity of 61.5 W/m$^2$ and a light wavelength of 300 nm to 400 nm for 1,000 hours in an atmospheric condition of 50° C.

2. The cylindrical battery cell according to claim 1, wherein the heat-shrinkable tube further comprises a pigment for realizing a color.

3. The cylindrical battery cell according to claim 1, wherein the polyester-based resin is polyethylene terephthalate.

4. The cylindrical battery cell according to claim 3, wherein the polyester-based resin is included in an amount of 70 weight % to 90 weight % of the total weight of the heat-shrinkable tube.

5. The cylindrical battery cell according to claim 1, wherein the heat-shrinkable tube of the cylindrical battery cell has a thickness ranging from 1 μm to 100 μm.

6. The cylindrical battery cell according to claim 1, wherein the benzophenone-based compound is hydroxy benzophenone.

7. The cylindrical battery cell according to claim 1, wherein the ultraviolet absorber is included in an amount of 0.1 weight % to 5 weight % of the total weight of the heat-shrinkable tube.

8. The cylindrical battery cell according to claim 2, wherein the pigment is included in an amount of 10 weight % to 20 weight % of the total weight of the heat-shrinkable tube.

9. The cylindrical battery cell according to claim 1, wherein the nylon-based resin is contained in the polyester-based resin in a blended state.

* * * * *